United States Patent
Takasaki et al.

(10) Patent No.: US 6,348,120 B1
(45) Date of Patent: Feb. 19, 2002

(54) METHOD OF MANUFACTURING RUBBER WEIR MAIN BODY

(75) Inventors: Mamoru Takasaki, Tokyo; Yoshihiro Sato, Yokohama, both of (JP)

(73) Assignee: Bridgestone Corporation, Tokyo (JP)

( * ) Notice: Subject to any disclaimer, the term of this patent is extended or adjusted under 35 U.S.C. 154(b) by 996 days.

(21) Appl. No.: 08/864,947

(22) Filed: May 29, 1997

Related U.S. Application Data

(63) Continuation of application No. 08/611,952, filed on Mar. 6, 1996, now abandoned, which is a continuation of application No. 08/193,756, filed on Feb. 3, 1994, now abandoned.

(30) Foreign Application Priority Data

Feb. 3, 1993 (JP) .............................................. 5-037321

(51) Int. Cl.$^7$ .......................... B32B 31/00; B29C 65/02
(52) U.S. Cl. ............................... 156/304.3; 156/304.5; 156/304.6; 405/91; 405/115
(58) Field of Search ................................ 156/157, 159, 156/304.3, 304.5, 304.6; 405/91, 115

(56) References Cited

U.S. PATENT DOCUMENTS

| | | | | |
|---|---|---|---|---|
| 3,053,724 A | * | 9/1962 | Galloway | ............ 156/304.6 X |
| 3,895,990 A | * | 7/1975 | Josteit | ................. 156/304.5 X |
| 4,350,374 A | * | 9/1982 | Brollo | ..................... 285/122.1 |
| 4,448,575 A | * | 5/1984 | Hanyu et al. | .................. 425/47 |
| 4,484,874 A | * | 11/1984 | Okawachi | ..................... 425/47 |
| 5,230,585 A | * | 7/1993 | Fujisawa et al. | ............. 405/115 |
| 5,305,565 A | * | 4/1994 | Nagahama et al. | ........... 52/177 |
| 5,348,782 A | * | 9/1994 | Arnold | ................. 156/304.5 X |
| 5,350,614 A | * | 9/1994 | Chase et al. | .............. 428/60 X |

FOREIGN PATENT DOCUMENTS

| | | | | |
|---|---|---|---|---|
| CA | 550996 | * | 12/1957 | .............. 156/304.5 |
| JP | 58-71119 | * | 4/1983 | ................. 156/157 |
| JP | 335098 | | 5/1991 | |

* cited by examiner

*Primary Examiner*—Mark A. Osele
(74) *Attorney, Agent, or Firm*—Sughrue Mion, PLLC

(57) ABSTRACT

A method of manufacturing a rubber weir main body, which manufactures a rubber weir main body intended to rise by the flow-in of a fluid and to fall by the discharge of the fluid by integrally bonding at least two main body segments divided in the circumferential direction to each other, including the steps of: forming a material removed portion with stepped portions at edges of the rubber weir main body segments previously manufactured; abutting the rubber weir main body segments on each other at the edges; laminating unvulcanized rubber sheets containing reinforcing canvasses and an unvulcanized rubber sheet on the material removed portion formed between both the rubber weir main body segments contacted with each other; and integrally vulcanizing and bonding them. With this method, a large sized rubber weir main body excellent in quality can be easily manufactured at a job site.

4 Claims, 4 Drawing Sheets

METHOD OF MANUFACTURING RUBBER WEIR MAIN BODY

This is a Continuation of application Ser. No. 08/611,952 filed on Mar. 6, 1996, which is a continuation of application Ser. No. 08/193,756, filed Feb. 3, 1994, both abandoned.

BACKGROUND OF THE INVENTION

The present invention relates to a method of manufacturing a bag-like rubber weir main body. The bag-like body inflates by the in-flow of water to block a river thereby forming an inflated weir, and which deflates by the discharge of water thereby allowing free the flow of water in the river.

For a rubber weir of increased size, large sized equipment is required to manufacture a rubber weir main body resulting in the increased cost of equipment. Further, at a job site, for example in the interior of a mountainous region, the transport of rubber weir main bodies is difficult to carry out.

To cope with the above-described problem, there has been conventionally proposed a method of manufacturing a main body by previously forming main body segments by means of dividing a rubber weir main body in the circumferential direction, and joining these main body segments. This prior art (Examined Japanese Patent Publication HEI 3-35098) will be described with reference to FIG. 8.

Namely, a rubber weir main body is manufactured by forming a material removed portion with stepped portions at edges of rubber weir main body segments 01 previously vulcanized and molded; fitting a rubber sheet 02 containing a reinforcing material, which is previously vulcanized and molded so as to be matched to the shape of the material removed portion, in the material removed portion of the rubber weir main body segments through an unvulcanized rubber 03; bonding then vulcanizing and bonding them.

This method, however, must prepare the previously vulcanized rubber sheet 02 containing a reinforcing material, to thereby increase the number of process steps and the cost of the device.

Further, when the materials of the edges of the rubber weir main body segments 01 are not accurately removed, the previously vulcanized rubber sheet 02 is not fitted with high accuracy even in the presence of the unvulcanized rubber therebetween, and thereby gaps 04 are possibly formed. Additionally, when the amount of the unvulcanized rubber 03 is unsatisfactory to be adjusted, gaps 04 are also generated, which causes separation and breaking.

Moreover, the rubber weir main body segments 01 are vulcanized and bonded to each other through the previously vulcanized rubber sheet 02 containing a reinforcing material; however, at this time the rubber sheet 02 is vulcanized gain, so that it is excessively vulcanized and is made rigid in its physical property. As a consequence, a flat plate portion with high rigidity is formed only in the joint portion, and accordingly the rubber weir main body is difficult to form into smooth curved shape when being raised.

SUMMARY OF THE INVENTION

Taking the above circumstances into consideration, the present invention has been made, and an object of the present invention is to provide a method of manufacturing a rubber weir main body capable of reducing a part of the conventional manufacturing processes, and accurately bonding rubber weir main body segments without enlarging the size of equipment.

To achieve the above object, according to the present invention, there is provided a method of manufacturing a rubber weir main body, which manufactures a rubber weir main body intended to rise by the in-flow of a fluid and to fall by the discharge of the fluid by integrally bonding at least two main body segments divided in the circumferential direction to each other, including the steps of: forming a material removed portion with stepped portions at edges of the rubber weir main body segments previously manufactured; abutting the rubber weir main body segments on each other at the edges; laminating unvulcanized rubber sheets containing reinforcing canvasses and an unvulcanized rubber sheet on the material removed portion formed between both of the rubber weir main body segments contacted with each other; and integrally vulcanizing and bonding them.

By use of the unvulcanized rubber sheets containing reinforcing canvasses, it is possible to reduce the number of processes. Further, when the material removed portion of the rubber weir main body segments is not accurately formed, since the unvulcanized rubber sheets containing reinforcing canvasses are matched to material removed portion, it is possible to bury gaps and hence to prevent the separation and breaking.

Since the rubber weir main body segments are joined and vulcanized/bonded to each other using the unvulcanized rubber sheets, it is possible to prevent the generation of any excessively vulcanized portion, and hence to manufacture the rubber weir main body being substantially homogeneous as a whole.

DETAILED DESCRIPTION OF THE PREFERRED EMBODIMENTS

An embodiment of the present invention will be described with reference to FIGS. 1 to 5.

Figure 1:
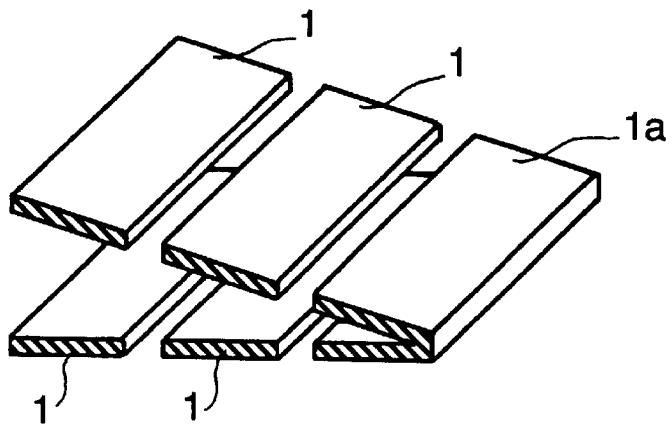
FIG. 1 is an exploded view in perspective of rubber weir main body segments according to an embodiment of the present invention.

A rubber weir main body in this embodiment is of a type in which one sheet is folded into two layers to be formed in a bag-like shape. As shown in FIG. 1, first, upper and lower main body segments 1 for forming a rubber weir main body are manufactured.

The rubber weir main body segment 1 is formed in a rectangular plate, and further, a folded segment 1a is formed in such a shape that a rectangular plate is folded into two layers.

The rubber weir main body segments 1 and 1a having such shapes are manufactured by vulcanization and molding, respectively.

Figure 2:
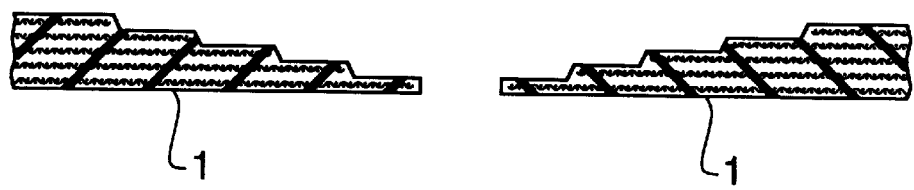
FIG. 2 is a side sectional view of rubber weir main body segments in which a material removed portion is formed.

Next, the joint portion of the rubber weir main body segments 1 is peeled in a stepwise manner together with reinforcing canvass buried therein so as to be sequentially narrowed (see FIG. 2).

The peeled surfaces of the joint portion are slightly buffed and are wholly stuck with thin rubber sheets each having a thickness of 0.5 mm.

Figure 3:
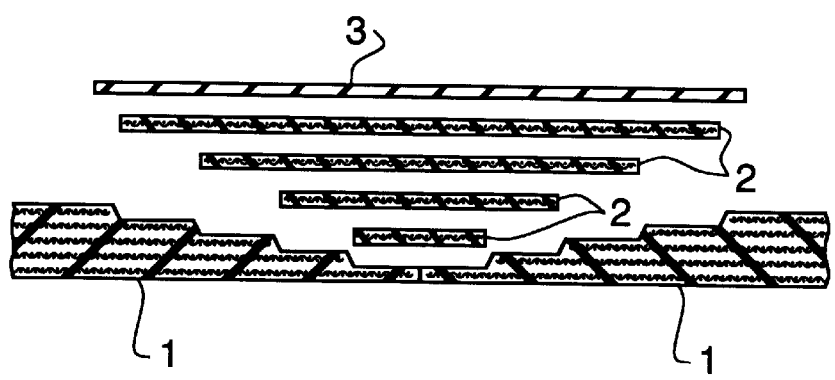
FIG. 3 is an exploded view in side section of a joint portion.

Next, by abutment of the edges of the adjacent rubber weir main body segments 1 on each other, the material removed portions thus peeled, as shown in FIG. 3, form a plurality of stepped portions which are sequentially broadened nearing the upper side while being centered on the abutment surface. Unvulcanized rubber sheets 2 each containing a reinforcing canvass are sequentially fitted and laminated in these stepped portions.

Near the upper layer, the wider rubber sheets 2 containing the reinforcing canvasses are sequentially used, and when gaps are generated, unvulcanized rubber sheets or rubber threads separately prepared are used to bury the gaps.

On the uppermost layer, an unvulcanized rubber sheet 3 as an outer layer is laminated to adjust the whole thickness.

Figure 4:
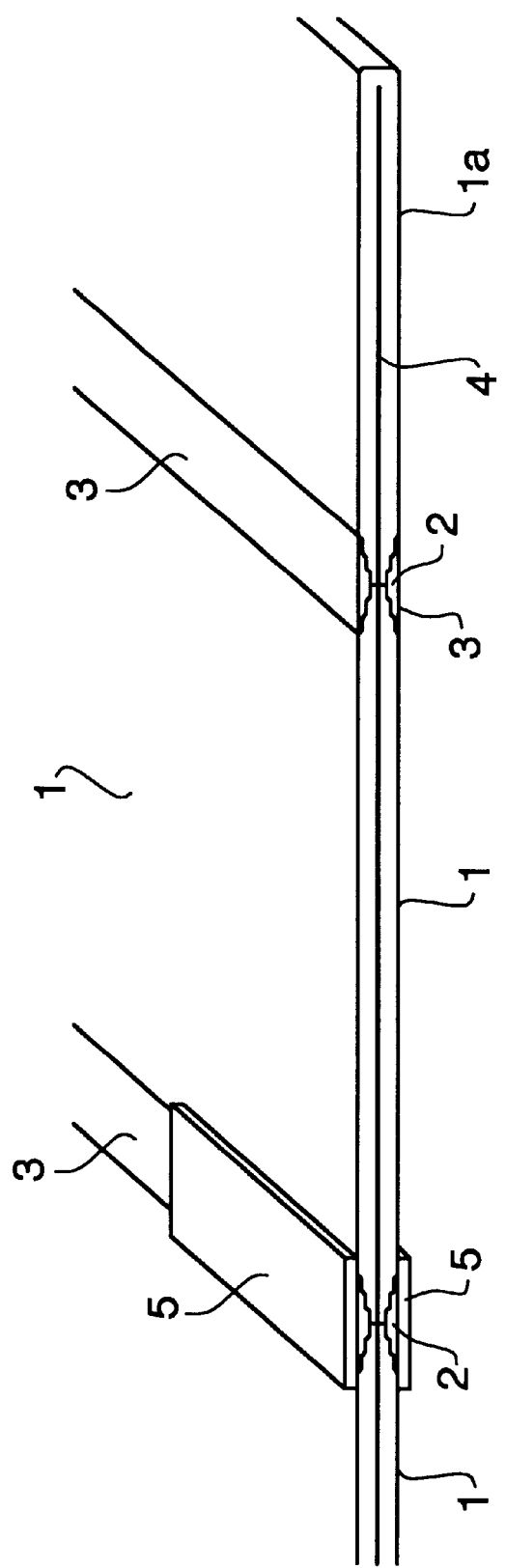
FIG. 4 is a partial perspective view of a rubber weir main body when being vulcanized and bonded.

The upper segments 1 and lower segments 1 of the rubber weir main body, each of which are joined to each other by fitting of the rubber sheets 2 containing the reinforcing canvasses and the rubber sheet 3 in the joint portions, are overlapped to each other while placing each separation sheet 4 therebetween (see FIG. 4).

The folded main body segment 1a is then joined to the one-sided ends of the upper and lower sheets thus overlapped in the same manner as described, whereas the other ends thereof are made to be open.

The upper and lower joints are located at the same positions, and each set of the joints is vertically clamped by a vulcanizing hot plate 5 for vulcanization and bonding.

The upper and lower joints are thus simultaneously vulcanized and bonded.

Rubber weir main bodies 10 thus obtained are placed, in a river-bed in such a manner as to direct the above-described open ends on the upstream side and to span the river, widthwise. The bodies are fixed on the river-bed while the upper and lower open ends are overlapped to each other.

Figure 5:
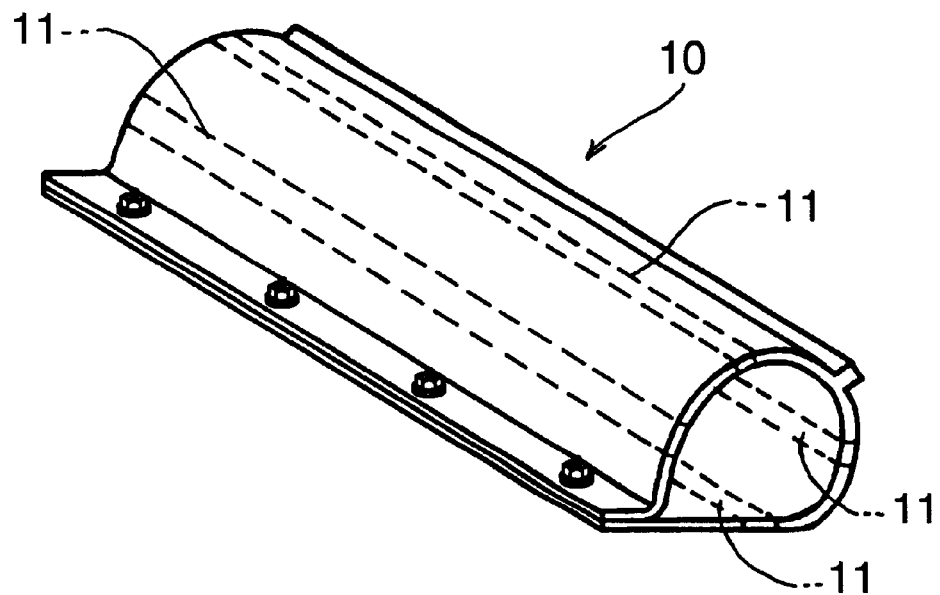
FIG. 5 is a perspective view partially in section showing the state where a rubber weir constructed using the manufactured rubber weir main body is raised.

By the in-flow of water within the rubber weir main body 10 formed in a bag-like shape, the rubber weir main body 10 swells and rises as shown in FIG. 5, to restrict the flow of water in the river. Likewise, by the discharge of the water, the rubber weir main body 10 falls to permit the free flow of water.

In the rubber weir main body 10, a plurality of joints 11 spaced apart from each other in the circumferential direction are directed in the widthwise direction of the widthwise river. However, since the unvulcanized rubber sheets 2 and 3 are vulcanized and bonded, there is no fear that only the joints are excessively vulcanized to be increased in rigidity. Accordingly, the rubber weir main body 10 has the substantially homogeneous property as a whole, and can form the smooth curve when being raised without any trouble in adjustment of the flow of water in a river.

Further, when the rubber sheets 2 are fitted in the material removed portions of the rubber weir main body segments 1 and 1a, the material removed portions of the rubber weir main body segments 1 and 1a are not required to be accurately manufactured because the rubber sheets 2 containing reinforcing canvass themselves are unvulcanized and deformed to be matched to the material removed portions. Additionally, since gaps generated can be buried by unvulcanized rubber threads or the like, there is never generated any gap within the material removed portion. This in turn eliminates the fear of causing the separation and breaking after vulcanization and bonding.

Since rubber sheets 2 containing reinforcing canvasses are not required to be previously manufactured by vulcanization, it is possible to reduce the number of process steps and the cost.

The rubber weir main body can be manufactured at a job site by carrying the rubber weir main body segments 1 and 1a prior to vulcanization and bonding as single bodies, and performing the vulcanizing and bonding works near the job site.

Accordingly, even for a large sized rubber weir, the large sized rubber weir main body is not required to be carried, and the rubber weir can be constructed even at a job site which is located in the interior of a mountainous region or one where the transport circumstances such as roads are not suitable.

Further, it is possible to manufacture a large sized rubber weir main body not obtained in the conventional manner, using existing equipment and a simple joining device.

Figure 6:
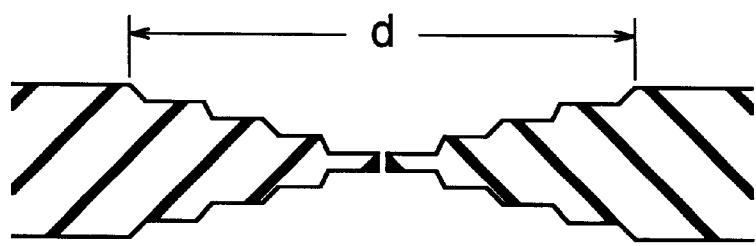
FIG. 6 is a partial side sectional view of rubber weir main body segments according to another embodiment.

In the embodiment described above, the stepwise removed portions are formed on the single surfaces of the rubber weir main body segments 1; however, as shown in FIG. 6, stepwise removed portions may be formed on both sides of the rubber weir main body segments, and unvulcanized rubber sheets containing reinforcing materials are fitted in the upper and lower removed portions to be subsequently vulcanized and bonded.

With this construction, the maximum width d of the joint can be made narrower than that in the above-described embodiment, which is advantageous in that the hot plate used in vulcanization be reduced in size.

Further, in the above-described embodiment, the rubber weir main body has the folded structure; however, the present invention may be applicable for the case that one sheet not folded is formed in a bag-like shape.

Figure 7:
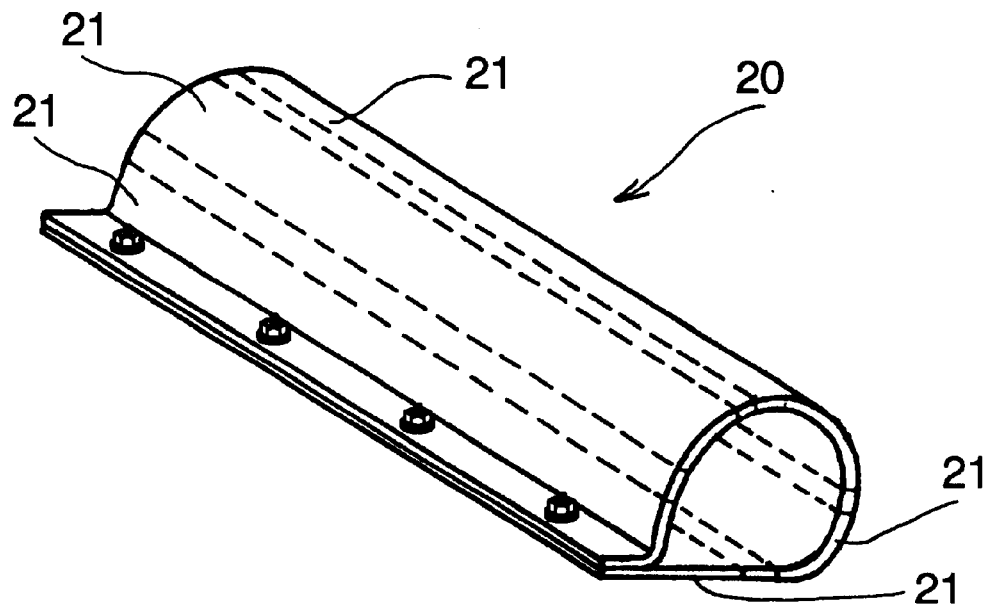
FIG. 7 is a perspective view partially in section showing the state where a rubber weir constructed using the manufactured rubber weir main body according to a further embodiment is raised.
Figure 8:
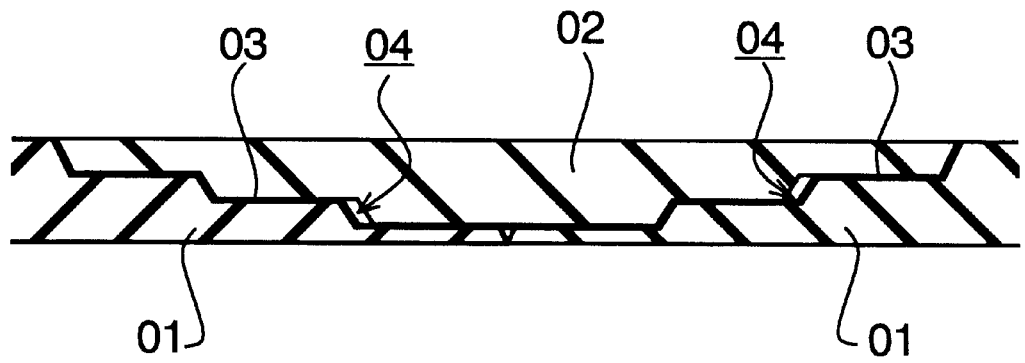
FIG. 8 is a side sectional view of a joint portion of a conventional rubber weir main body.

Namely, as shown in FIG. 7, rubber weir main body segments 21 are all composed of sheets not folded are vulcanized and bonded one by one, to form one bag-like rubber weir main body 20.

What is claimed is:

1. A method of manufacturing a rubber body of a bag shape to be used as weir main body which is subsequently placed on a river-bed in a widthwise direction of the river and rises by being filled with a fluid to form a weir, comprising the steps of:

preparing at least two rubber weir main body segments which form portions of said rubber weir main body extending in said widthwise direction of said river;

forming a material removed portion with steps at edges extending in said widthwise direction of each of said rubber weir main body segments;

contacting said rubber weir main body segments with each other at said edges;

laminating unvulcanized rubber sheets containing reinforcing canvass on said material removed portions between both said rubber weir main body segments contacted with each other; and vulcanizing said unvulcanized rubber sheets by contact with a hot plate for integral bonding with said rubber weir main body segments to form a weir main body having a substantially uniform cross-sectional shape in said widthwise direction.

2. A method of manufacturing a rubber weir main body according to claim 1, wherein said material removed portion is formed on single surfaces of said rubber weir main body segments.

3. A method of manufacturing a rubber weir main body according to claim 1, further comprising the steps of laminating a plurality of unvulcanized rubber sheets containing reinforcing canvass sequentially on said material removed portion, and laminating a non-reinforced unvulcanized rubber sheet on the outside of said sheets containing canvass.

4. A method of manufacturing a rubber body of a bag shape to be used as weir main body which is subsequently placed on a river-bed in a widthwise direction of the river and rises by being filled with a fluid to form a weir, comprising the steps of:

preparing at least two rubber weir main body segments which form portions of said rubber weir main body extending in said widthwise direction of said river;

forming a first material removed portion with steps at edges extending in said widthwise direction of each of said rubber weir main body segments;

forming a second material removed portion with steps extending in the said widthwise direction, and wherein the material removed portions are formed on upper and lower surfaces of each of said rubber weir main body segments;

contacting said rubber weir main body segments with each other at said edges;

laminating unvulcanized rubber sheets containing reinforcing canvass on said material removed portions between both said rubber weir main body segments contacted with each other; and vulcanizing said unvulcanized rubber sheets by contact with a hot plate for integral bonding with said rubber weir main body segments.

\* \* \* \* \*